United States Patent Office 3,122,699
Patented Feb. 25, 1964

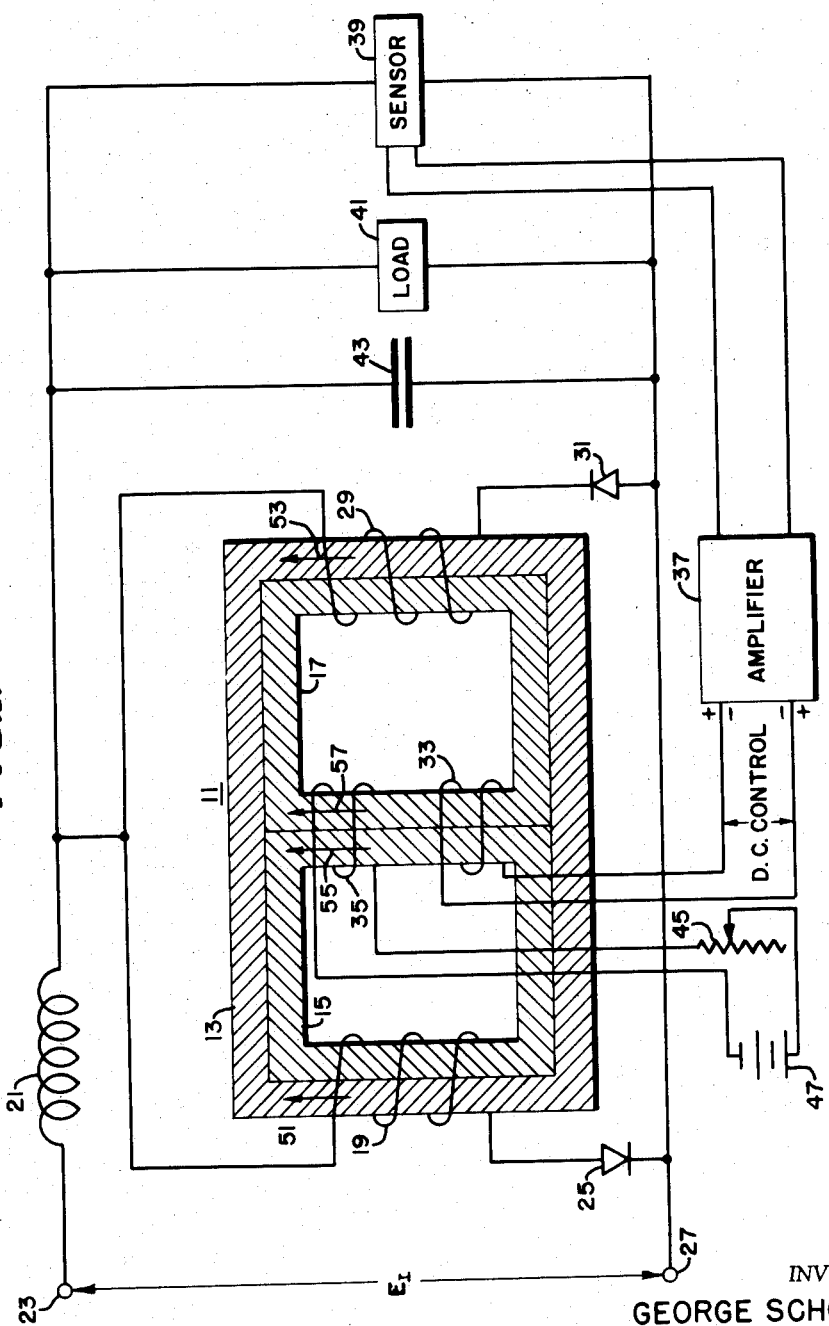

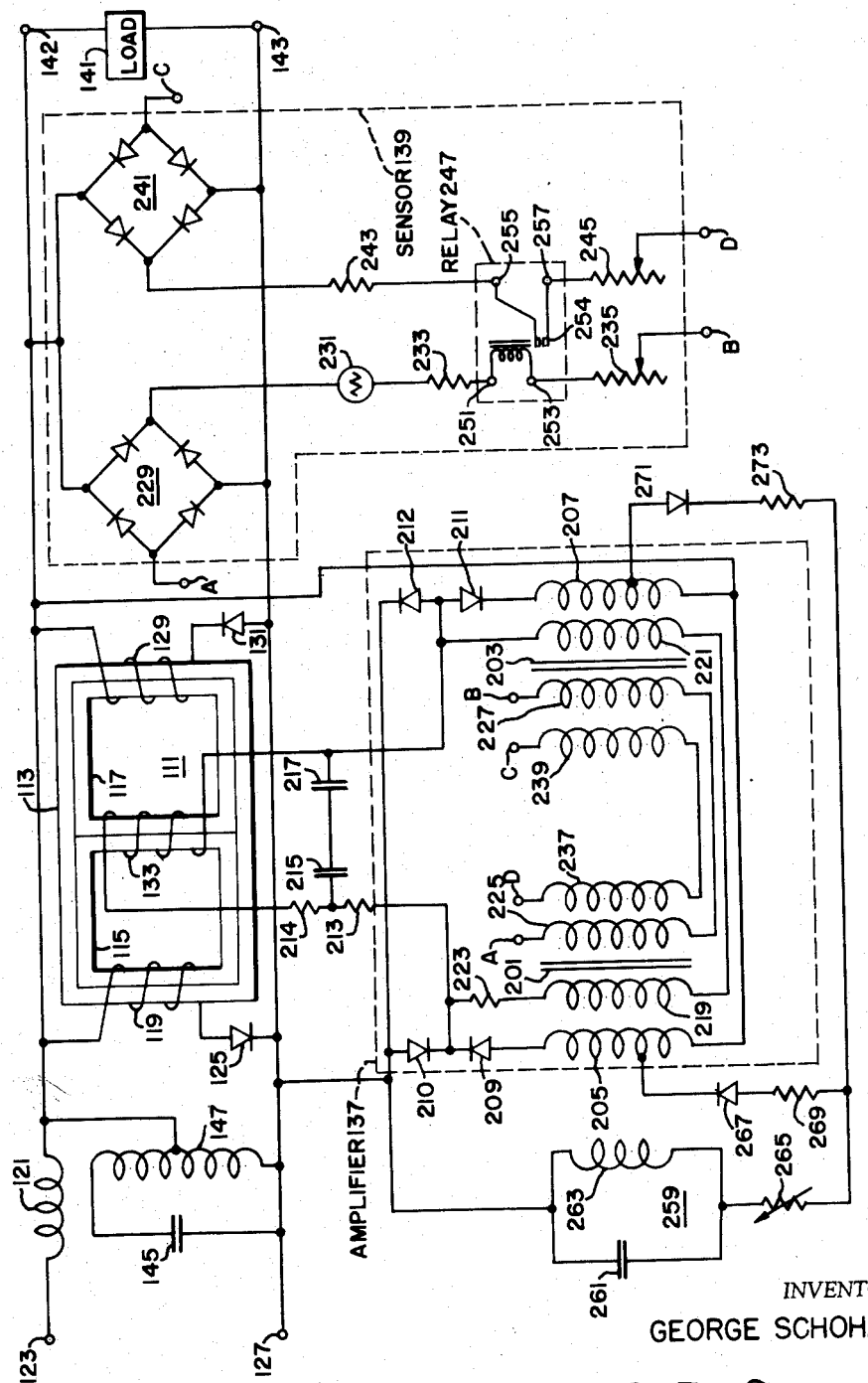

3,122,699
MAGNETIC VOLTAGE REGULATOR
George Schohan, Washington, D.C., assignor to the United States of America as represented by the Secretary of the Navy
Filed July 28, 1959, Ser. No. 830,165
3 Claims. (Cl. 323—83)
(Granted under Title 35, U.S. Code (1952), sec. 266)

The invention described herein may be manufactured and used by or for the Government of the United States of America for governmental purposes without the payment of any royalties thereon or therefor.

This invention relates generally to a voltage regulator and more particularly to a voltage regulator having a ferroresonant circuit.

This invention utilizes the principle of a ferroresonant voltage stabilizer. The ferroresonant circuit is formed by a capacitor and a non-linear reactor connected in parallel. The ferroresonant circuit is connected serially through a linear inductor to a source of A.-C. voltage. A load circuit is connected in parallel with the ferroresonant circuit. Rectangular hysteresis loop material is used in the core of the saturable reactor unit. The average output voltage from such a device is inherently constant, providing the frequency of the input voltage is constant.

Previously, voltage regulators have been made in which the non-linear reactive unit of the ferroresonant circuit was modified to include a pair of non-linear reactor elements serially connected in order to provide voltage regulation for a particular voltage range. The use of serially connected non-linear reactors, however, presents a considerable design problem. For example, one of the reactor elements is usually designed to absorb a major portion of the applied voltage and is usually larger than the other reactor element. The larger reactor element requires a greater magnetizing current than the smaller unit since the larger unit has a greater mean length of magnetizing path. When a magnetizing voltage is applied across this series circuit, the voltage will be initially supported by the smaller reactor element since the impedance of the larger reactor element at this time is negligible, there being insufficient ampere turns to fully magnetize the larger reactor element. The impedance of the larger reactor element will increase only after the smaller reactor element is saturated. There is a slight interval in time between the saturation of the smaller reactor element and the establishment of sufficient magnetizing ampere turns in the larger reactor element in which the series connected reactor elements appear as a low impedance to the capacitor of the ferroresonant circuit. The capacitor will discharge prematurely through this low impedance path, interfering with the operation of the ferroresonant circuit.

In accordance with this invention, a saturable core and a magnetic amplifier are combined into a single unit. A composite core has been uniquely adapted to make this combination possible. An outer rectangular shaped core and two inner rectangular shaped cores are fitted together to form a composite core having a three-legged configuration. With this arrangement, the magnetic path of the outer core is effectively isolated from the magnetic paths of the inner cores. Commercially available 3-phase transformer cores having such composite structure may be employed.

It is an object of this invention to provide an A.-C. voltage regulator which will maintain a constant output voltage for a given range of input voltage variation.

It is another object of this invention to provide an A.-C. voltage regulator employing a ferroresonant circuit.

It is another object of this invention to provide an A.-C. voltage regulator having a magnetic amplifier with a composite core structure.

It is another object of this invention to provide an A.-C. voltage regulator employing a ferroresonant circuit in which the non-linear element is a combination of a saturable reactor and a magnetic amplifier.

It is still another object of this invention to provide a magnetic voltage stabilizer for A.-C. voltages that will correct for input voltage and frequency changes.

It is still another object of this invention to provide a composite core structure in an A.-C. voltage regulator which will provide for effectively isolated magnetic flux paths.

It is a further object of this invention to provide an A.-C. magnetic voltage regulator in which a linear resonant circuit provides a partial regulation of the output voltage.

Other objects and many of the attendant advantages of this invention will be readily appreciated as the same becomes better understood by reference to the following detailed description when considered in connection with the accompanying drawings wherein:

FIG. 1 illustrates an embodiment of the voltage regulator of this invention; and FIG. 2 illustrates a particular embodiment of this invention showing amplifier and sensor circuitry.

Referring now to FIG. 1 in which the voltage regulator is illustrated, core assembly 11 is comprised of outer core unit 13 and inner core units 15 and 17. Each of the core units is made up of tape wound or laminated rectangular hysteresis loop core material. The core units as assembled form a composite three-legged core. One outer leg of the composite core is composed of a portion of outer core unit 13 and a portion of inner core unit 15. The other outer leg is composed of a portion of outer core unit 13 and a portion of inner core unit 17. The center leg of the composite core is composed of a portion of inner core unit 15 and inner core unit 17. A saturating winding 19 is wound on the outer leg comprised of core units 13 and 15. Winding 19 is connected at one end through linear reactor 21 to input terminal 23 and at the other end through rectifier 25 to input terminal 27. In like manner winding 29 is wound around the outer leg formed by core units 13 and 17. Winding 29 connects at one end through linear reactor 21 to input terminal 23 and at the other end through rectifier 31 to input terminal 27. An A.-C. input voltage $E_I$ is applied to input terminals 23 and 27. A control circuit is comprised of control winding 33 and bias winding 35, each wound on the center leg of the composite core formed by inner core elements 15 and 17. Control winding 33 connects through amplifier 37 to the output of sensor 39. The input of sensor 39, load 41, connect through linear reactor 21 to input terminals 23 and 27.

The combination of core 11 with the saturating winding, bias windings, control winding and capacitor 43 comprise the ferroresonant circuit of the regulator. Bias winding 35 is illustrated as connected through potentiometer 45 to battery 47.

The saturable reactor portion of the circuit is comprised of saturating windings 19, 29 and core 13. The magnetic amplifier portion of the circuit comprises core units 15, 17, control winding 33, bias winding 35 and windings 19 and 29. For one polarity of an alternating voltage, current will flow through winding 19 and for the opposite polarity, current will flow through winding 29 to the orientation of rectifiers 25 and 31, respectively. Current flow through windings 19 and 29 will drive the cores toward saturation in a particular direction in dependence upon the direction of current flow and the direction or sense of the particular winding on the core. Arrows are used to indicate a particular direction of magnetization. The directions indicated are for illustration of operation only and not necessarily the actual directions of the magnetization effected by the various windings on the core structure.

For example, let it be assumed that current flow through winding 19 will produce magnetization or drive core 13 toward saturation in the direction indicated by arrow 51 and current flow through winding 29 will produce magnetization or drive the core 13 toward saturation in the direction indicated by arrow 53. Cores 15 and 17 will be driven toward saturation by windings 19 and 29 in the directions indicated by arrows 51 and 53, respectively.

The magnetization of cores 15 and 17 is further affected by control winding 33 and bias winding 35. The control circuit is designed such that the net effect of the bias and control windings will produce magnetization in cores 15 and 17 in opposite directions to that created by cores 19 and 29, respectively. The direction of saturation caused by windings 33 and 35 is illustrated by arrow 55 for core 15 and arrow 57 for core 17. The bias winding 35 is designed to produce a magnetizing force in opposition to that created by saturating windings 19 and 29 as indicated by arrows 55 and 57. The amount of magnetizing force may be changed in magnitude by adjusting potentiometer 45. The control winding 33 may have a voltage of either polarity applied to it and hence may either aid or subtract from the magnetization created by bias binding 35. The magnitude of the magnetization created by control winding 33 may be less or equal to that created by bias winding 35 but never greater. The magnitude and polarity of the D.-C. control voltage applied to winding 35 will vary in accordance with the voltage across the load as hereinafter described in greater detail.

In operation the output or load voltage is adjusted to a desired reference level for a given input voltage $E_I$ by adjusting potentiometer for the proper amount of bias voltage. The output from sensor 39 at this desired voltage reference level will be substantially zero. As long as the output voltage remains at the desired reference level, the opposing magnetic flux in cores 15 and 17 will be created entirely by the bias voltage applied to winding 35. The opposing magnetic flux created by the bias voltage will reduce the residual flux in cores 15 and 17 created by current flow through windings 19 and 29. The resulting flux level will be such that the effective impedance values of windings 19 and 29 will cause the desired voltage drop across the load 41. The opposing flux is not applied to core 13. The residual flux in core 13 created by winding 19 is completely removed by an equal and opposite flux created by winding 29. Sensor 39 will detect a change in the load voltage and apply a signal to amplifier 37 in a polarity and magnitude dependent upon the direction and magnitude of the change in load voltage from the desired reference level. When the load voltage drops below the desired reference level a signal voltage from the sensor will be amplified by amplifier 37 and applied to the control winding 33. The polarity of the voltage applied will be of a polarity that will create a magnetic flux in the same direction as that created by bias winding 35. The additional opposing flux thus created will further reduce the magnetization level of cores 15 and 17 and effectively increase the impedance of windings 19 and 29. The increased impedance in windings 19 and 29 will cause a greater voltage drop thereacross and hence a greater voltage drop across load 41. When the voltage increases to the desired reference level the sensor output voltage will drop to substantially zero. Conversely, when the load voltage rises above the desired reference level an output voltage of opposite polarity will be applied from sensor 39 through amplifier 37 to control winding 33. The flux created by winding 33 will be opposite in direction from the opposing flux created by bias winding 35. In other words, the opposing flux produced by the bias voltage will be effectively reduced. The reduction in opposing flux effectively decreases the impedance in windings 19 and 29 and the voltage drop across these windings and across the load will decrease. The load voltage will decrease until the desired reference level is reached at which time the sensor output voltage will again be substantially zero.

Referring now to FIG. 2 of the drawings, a core 111 is composed of outer core member 113 and inner core members 115 and 117. Saturating winding 119 is wound around a leg portion composed of a portion of core 113 and a portion of core 115. Winding 119 connects through linear inductor 121 to input terminal 123 and through rectifier 125 to input terminal 127. Saturating winding 129 is wound on a leg of the core formed by a portion of core 113 and a portion of core 117. A control winding 133 is wound on the center leg formed by portions of cores 115 and 117. Control winding connects through a magnetic amplifier 137 to a sensor 139. A load 141 is shown connected across output terminals 142 and 143. Capacitor 145 of the ferroresonant circuit in this embodiment of the invention is connected across transformer 147. Transformer 147 connects from a tap of the winding to terminal 142 and from the other end of the winding to output terminal 143. The magnetic amplifier 137 connects to control winding 133 through a decoupling circuit comprising resistors 213 and 214 and capacitors 215 and 217. Transformer 147 permits the use of a smaller capacitor than normally used in a ferroresonant circuit.

The magnetic amplifier 137 has two preferably toroidal cores 201 and 203. Load windings 205 and 207 connect through rectifiers 209, 210, 211 and 212 and through resistors 213 and 214 to control winding 133 of composite core 111 and to output terminals 142 and 143. Capacitors 215 and 217 together with resistors 213 and 214 form a decoupling circuit between control winding 133 and load windings 205 and 207. Feedback windings 219 and 221 connect to winding 133 through resistors 213 and 214 and through resistor 223. Control windings 225 and 227 connect to the output terminals 142 and 143 through rectifier bridge 229. Control windings 225 and 227 are connected to a part of the sensor circuit including sensor element 231, resistor 233 and adjustable gain setting resistor 235. Control windings 237 and 239 connect to output terminals 142 and 143 through rectifier bridge 241. Control windings 237 and 239 are connected to a part of the sensor circuit which includes resistor 243 and adjustable balancing resistor 245. Terminals A, B, C and D are connected together respectively. Relay 247 illustrated as a coil member 249 connected to terminals 251 and 253 and contact points 254 which are connected to terminals 255 and 257. Relay 247 is optional and may be omitted, in which case terminals 251 and 253 are connected together and terminals 255 and 257 are connected together.

A novel circuit has been added to magnetic amplifier 137 to improve the regulation of the system. Resonant circuit 259 includes capacitor 261, reactor 263, and a variable resistor 265. The resonant circuit is serially interconnected to the output terminals through a bias circuit which includes a bias portion of winding 205, a rectifier 267, a resistor 269, a bias portion of winding 207, a rectifier 271, and a resistor 273. The conductive path for a half-cycle of output voltage having one particular polarity, for example, would be from terminal 142 through the bias portion of winding 207, through rectifier 271, resistor 273, variable resistor 265 and through resonant circuit 259 to output terminal 143. For a half cycle of opposite polarity, the conductive path would be from terminal 143 through resonant circuit 259, through variable resistor 265, through resistor 269, through rectifier 267, through the bias portion of winding 205 to output terminal 142.

The operation of the circuit illustrated in FIG. 2 is generally similar to that of FIG. 1 in that a change in output voltage will create an unbalance in the sensor circuit 139 which is amplified by amplifier circuit 137 and applied to control winding 133 on core 111. The control of core 111 is effected with a single control winding rather than by separate bias and control windings. Another difference is that the amplifier employed is a magnetic amplifier combined with a special bias controlling resonant circuit which compensates for frequency changes. The sensor circuit 139 operates on a current unbalance rather than a voltage output as described in the operation of the circuit of FIG. 1.

Magnetic amplifier 137 is supplied with load windings 205 and 207 on cores 201 and 203 respectively which connect to control winding 133 to supply a control current thereto. The amount of control current flowing through winding 133 is dependent upon the magnetic flux levels in cores 201 and 203. The magnetic flux levels in cores 201 and 203 are primarily controlled by windings 205 and 207 respectively. Windings 219 and 221 are feedback windings which are connected such as to provide negative feedback to amplifier 137. Negative feedback is employed to improve the linearity of the gain characteristic, reduce delay and to dampen oscillations which might otherwise be sustained in amplifier 137. Resistor 223 limits the feedback current to a desired value.

In operation of sensor 139, gain setting resistor 235 is adjusted to a value of current flow through sensor element 231 that will provide a desired gain in the sensor circuit. The balancing resistor 245 is then adjusted until the magnetizing effect of the current flow through windings 237 and 239 on cores 201 and 203 is completely nullified by the magnetizing effect of the current flow through windings 225 and 227. The nullification of the magnetizing effects of windings 237 and 239 may be achieved by applying these windings on cores 201 and 203, respectively, in opposite sense to windings 225 and 227. When the load voltage varies from the desired reference level the current flow through the two branches of the sensor circuit will change by unequal amounts because the sensor element will change in resistance value. This unbalance in current flow through the two branches will cause a change in the magnetizing flux created by current flow through windings 237 and 239 with respect to the magnetizing effect of current flow through windings 225 and 227 and a differential magnetizing flux will be applied to cores 201 and 203. This magnetizing flux applied to cores 201 and 203 will cause a change in current flow through load windings 205 and 207 and hence through control winding 133. The change in current flow in control winding 133 will act to change the effective impedance in the load windings 129 and 133 and thus change the output voltage as explained earlier in reference to FIG. 1.

Resonant circuit 259 is designed to cause a change in current flow through control winding 133 in the following manner. The resonant circuit is energized by the output circuit alternately through bias windings 205 and 207 as explained earlier. A change in frequency of the output voltage will result in a change in the impedance of resonant circuit 259 and as a result the current flow through the bias portions of windings 205 and 207 will be changed. This change in current flow will change the magnetic flux levels in cores 201 and 203 which further causes a change in the current flow through load windings 205 and 207 and thus a change in control winding 133. The effect of this resonant circuit is to reduce the output voltage variation when the sensor circuit is not operating. Resonant circuit 259 is designed to resonate below the lowest operating frequency of the regulator, hence the impedance of the resonant circuit will decrease as the operating frequency increases. With the use of a tuned circuit, the voltage output will vary from about 0 to +2 volts from the desired reference voltage level when the sensor circuit is inoperative.

Relay 247 which is optionally provided will operate to disconnect the second branch of the sensor circuit from amplifier 137 should sensor element 231 burn out.

In a preferred embodiment of this invention, rectangular hysteresis loop materials such as grain oriented silicon iron may be used for the core structure of the composite core. The core of magnetic amplifier 137 may be made of .002" x 1½" rectangular hysteresis loop material such as that known in the art as Supermalloy.

The voltage regulators of this invention are operated in the 115 volt, 60 cycle range although the circuit may be constructed to operate at other voltages and frequencies.

With the regulator disclosed in FIG. 2, the output voltage is maintained within ±0.25 percent of the desired reference level. The major correction of the voltage occurs in about 4 cycles of operation and the voltage output is entirely corrected in about 12 cycles of operation. Distortion of the input wave form had little if any effect on the output voltage.

The resonant circuit operating without the sensor circuit will keep the output voltage within ±1 volt at the 115 voltage range.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An A.-C. magnetic voltage stabilizer comprising a ferroresonant circuit and a linear inductor serially interconnected to a pair of input terminals, means applying an A.-C. voltage to said input terminals, said ferroresonant circuit comprising a magnetic amplifier and a capacitor connected in parallel relationship, a load circuit, said load circuit connected across said ferroresonant circuit, said magnetic amplifier comprising a composite closed three-legged core having an outer core and a first and a second inner core, a first outer leg of said composite core formed by a portion of said outer core and a portion of said first inner core, a center leg portion of said composite core formed by a portion of said first inner core and a portion of said second inner core, a second outer leg formed by a portion of said second inner core and a portion of said outer core, a first saturating winding on said first outer leg, a second saturating winding on said second outer leg, a first unilateral impedance means, a second unilateral impedance means, means serially interconnecting said first saturating winding and said first unilateral impedance means across said load such that current is permitted to flow through said first saturating winding during positive half cycles of an A.-C. voltage applied thereto whereby said outer core and said first inner core are driven toward saturation, means serially interconnecting said second saturating winding and said second unilateral impedance means across said load such that current is permitted to flow through said second saturating winding during negative half cycles of said A.-C. voltage applied thereto whereby said outer core is desaturated and said second inner core is driven toward saturation, a bias and control circuit including a bias winding on said center leg, a source of variable D.-C. voltage connected thereto and operative to reduce the magnetization level in said first and second inner cores by a desired amount necessary to provide an effective impedance value across said saturating windings such that the desired load voltage is attained, a second amplifier, a sensor connected across said load and having an output circuit connected to said second amplifier and operative to produce a voltage of a magnitude and polarity dependent upon the magnitude of load voltage, said second amplifier being connected to said bias and control winding and operative to amplify said voltage from said sensor and apply the amplified voltage to said bias and control winding whereby the magnetization level of the first and second inner cores may be increased or decreased as necessary to raise or lower the load voltage to a desired reference level.

2. The combination of an A.-C. magnetic amplifier and saturable reactor comprising a composite three-legged core formed of a rectangular hollow outer core element and a first and a second hollow rectangular inner core element, a first leg of said core formed of a portion of said outer core and a portion of said first inner core, a second leg of said core formed by a portion of said first inner core and a portion of said second inner core, a third leg of said core formed of a portion of said second inner core and a portion of said outer core, a source of A.-C. voltage having first half-cycles and second half-cycles of operation, a first winding on the first leg of said core, a first unilateral impedance means serially interconnected to said first winding and to said source of A.-C. voltage and polarized to permit current flow through said first winding during first half cycles of operation of said source of A.-C. voltage, a second winding on the third leg of said core, a second unilateral impedance means serially connecting said second winding to said source of A.-C. voltage and polarized to permit current flow through said second winding during second half-cycles of said source of A.-C. voltage, a saturable reactor formed of said outer core and said first winding and said second winding, said first winding operable to drive said outer core toward saturation during first half cycles of said A.-C. voltage, said second winding operable to desaturate said outer core during the second half cycles of said A.-C. voltage, a control circuit on the second of said cores connected to a source of polarity-reversible D.-C. voltage, a magnetic amplifier formed by said first and second windings, said first and second inner cores and said control circuit, said first winding operable to drive said first inner core toward saturation and said second winding operable to drive said second inner core toward saturation, and said control circuit operable to aid or oppose the saturation created in said first and second cores by said first and second windings.

3. An A.-C. magnetic voltage regulator comprising a magnetic means and a capacitor connected in parallel relationship, load means, a sensor having input means and output means, a pair of input terminals connectable to a source of A.-C. voltage, said magnetic means connected to said input terminals, said load means and the input means of said sensor being connected in parallel to said magnetic circuit, said magnetic means including a combination of a magnetic amplifier and a saturable reactor, said magnetic amplifier including inner core means, saturating winding means, a control circuit coupled to said inner core, and bias means coupled to said inner core, said saturable reactor comprising said saturating winding means and an outer core, said saturating winding means being common to said inner core and said outer core, said sensor output means being connected to said control circuit whereby a change in voltage across said load will cause a change in the saturation level of said inner core means.

References Cited in the file of this patent
UNITED STATES PATENTS

| | | |
|---|---|---|
| 2,358,394 | Haug | Sept. 19, 1944 |
| 2,400,994 | Hortsman et al. | May 28, 1946 |
| 2,437,837 | Saretsky | Mar. 16, 1948 |
| 2,444,794 | Uttal et al. | July 6, 1948 |
| 2,709,779 | Bixby | May 31, 1955 |
| 2,777,987 | Deal | Jan. 15, 1957 |